June 20, 1939.  E. R. BARRETT  2,162,831
AUTOMOBILE DUMP BODY AND HOIST
Original Filed May 31, 1935  2 Sheets-Sheet 1
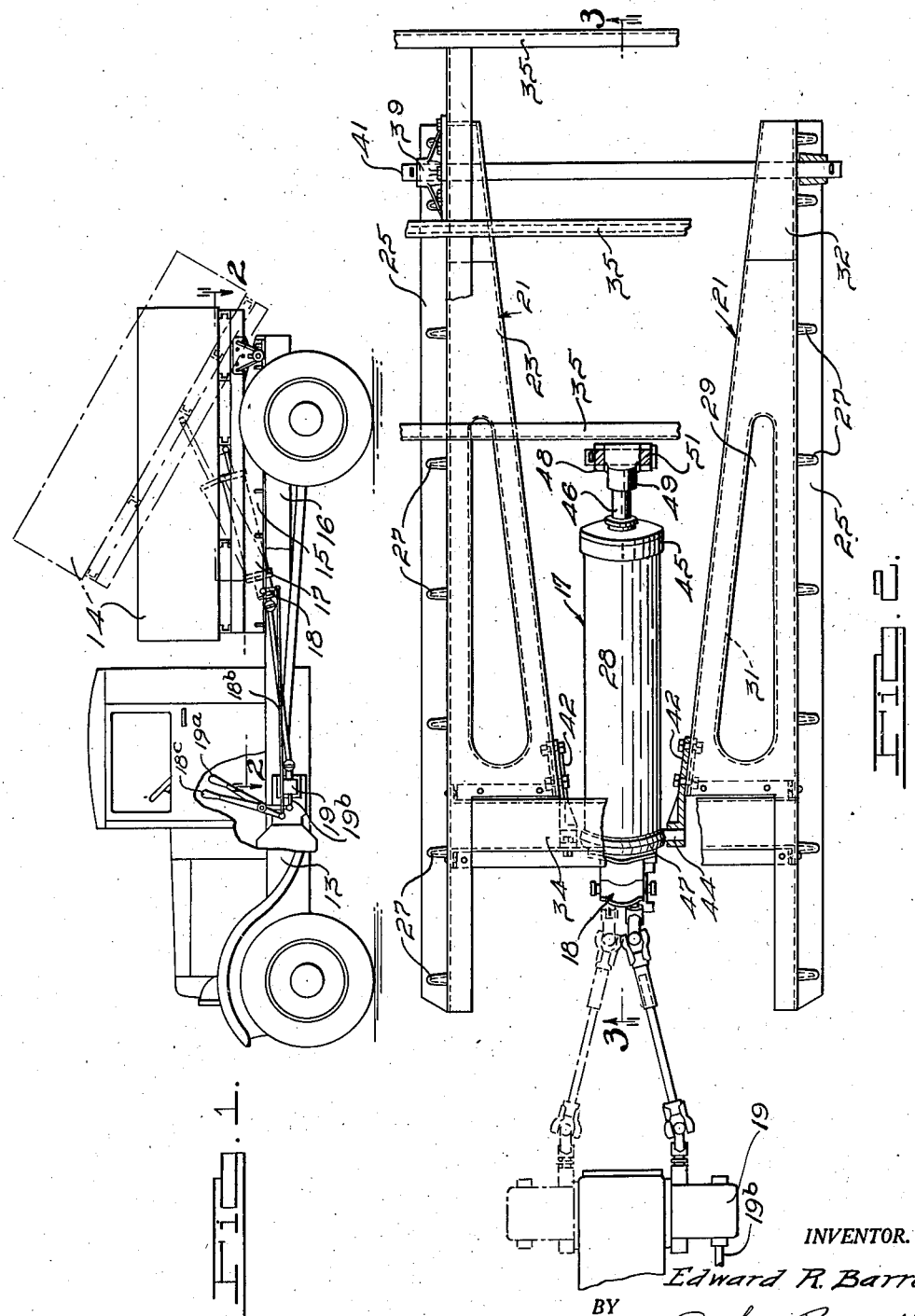
INVENTOR.
Edward R. Barrett.
BY
Harness, Dickey, Pierce & Hann.
ATTORNEYS.

June 20, 1939.   E. R. BARRETT   2,162,831
AUTOMOBILE DUMP BODY AND HOIST
Original Filed May 31, 1935   2 Sheets-Sheet 2
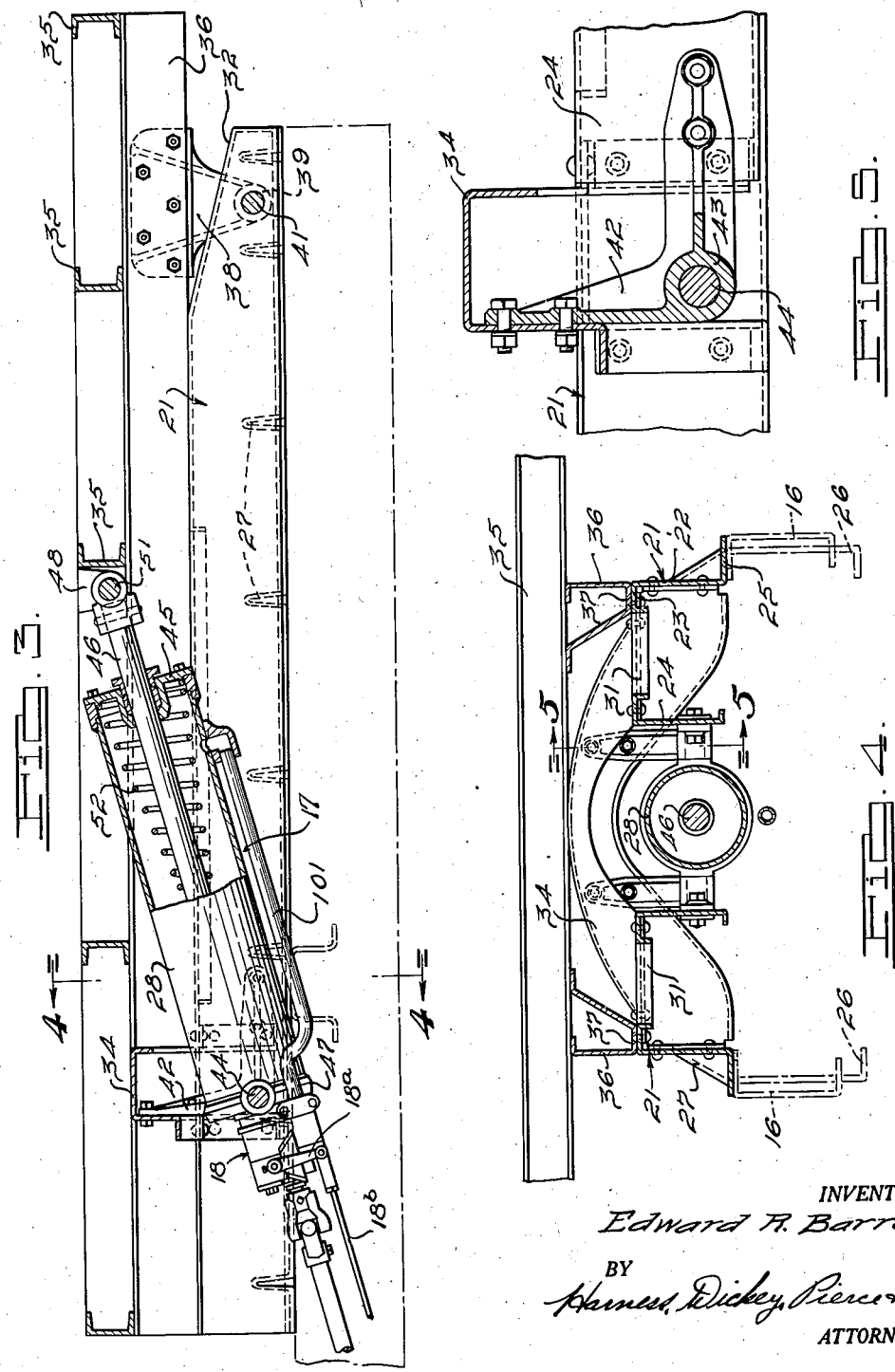
INVENTOR.
Edward R. Barrett.
BY
ATTORNEYS.

Patented June 20, 1939

2,162,831

UNITED STATES PATENT OFFICE 2,162,831

AUTOMOBILE DUMP BODY AND HOIST

Edward R. Barrett, Detroit, Mich., assignor to Gar Wood Industries, Inc., a corporation of Michigan Application May 31, 1935, Serial No. 24,375
Renewed February 23, 1939

11 Claims. (Cl. 298—22)

My invention relates to automotive vehicles and particularly to an automotive vehicle having a tiltable body thereon and to the method and means of tilting and positioning the body.

While automotive vehicles of the dump body type have been employed heretofore in the art embodying a device for tilting the body which is driven by the engine of the vehicle, my present invention relates to improved structure both for supporting the dump body and also for controlling the position of the body.

The dump body is constructed primarily for a small automobile chassis frame and is of unique construction in that one complete assembly may be employed on different chassis frames which may vary materially in size, shape and width. This is effected by utilizing sills for the body supporting frame which are of downwardly presenting channel section, having an outwardly directed braced flange which engages chassis frames of various widths. The web of each sill of the body frame is of triangular form positioning the inner flanges close together near the front end of the frame. The flanges receive and support brackets which engage trunnions provided on the near head of the cylinder. This construction permits the oscillation of the cylinder and its operation without producing a large bending moment on the sills as occurred when a shaft supported the cylinder on the other webs of the sills.

The side sills are interconnected at this point by a single cross brace which engages the side flanges of the sills as well as the inwardly extending portions thereof. The rear ends of the sills are interconnected by a shaft which is welded directly thereto to provide a cross brace for this end of the frame and a support for the brackets on which the dump body pivots when tilted. The cylinder of the tilting or hoisting mechanism is unique in having the head, which is provided with the supporting trunnions, also support the pump for circulating the fluid, preferably oil, from one side of the piston to the other to effect the tilting of the dump body.

Accordingly, the main objects of my invention are; to provide a sill construction for a dump body which may be attached to several different automobile chassis frames; to construct a dump body sill of inverted channel section, having an outwardly extending braced and inwardly converging flanges; to construct a supporting frame for a dump body from two side sill stampings and a third stamping interconnected therewith near the front end of the frame; to interconnect the rear end of the sills with a shaft which is welded thereto to provide strength and form pivots upon which the brackets of the dump body rotate; to mount trunnions provided on the head of a cylinder which effect the tilting of the dump body, on brackets carried by the cross brace and inner flanges of the sills; and in general to provide a dump body for an automotive vehicle chassis frame which is attachable to various types and widths of frames, having parts interchangeable to locate the power take-off device and controls from either side of the device and transmission; which is simple in construction, positive in operation and which is economical of manufacture.

Other objects and features of novelty of my invention will be either specifically pointed out or will become apparent when referring, for a better understanding of my invention, to the following description taken in conjunction with the accompanying drawings, wherein:

Figure 1 is a view, partly in section and partly in elevation, of an automotive vehicle having a dump body which embodies features of my invention;

Fig. 2 is an enlarged sectional view of the structure illustrated in Fig. 1, taken on the line 2—2 thereof, Fig. 3 is an enlarged sectional view of the structure illustrated in Fig. 2, taken on the line 3—3 thereof, Fig. 4 is a sectional view of the structure illustrated in Fig. 3, taken on the line 4—4 thereof, and, Fig. 5 is an enlarged sectional view of the structure illustrated in Fig. 4, taken on the line 5—5 thereof.

An automobile vehicle 13 is illustrated in Fig. 1 provided with a dump body 14 which is supported for tilting movement on a sill frame 15 which rests upon and is secured to the chassis frame 16 thereof. A hoisting mechanism 17, mounted on the sill frame 15, is utilized for hoisting, by tilting the dump body 14 into a position illustrated in dot-and-dash line. A fluid pumping mechanism 18 is carried by the hoisting mechanism 17 which is driven from the transmission of the automotive vehicle. A power take-off device 19 is interconnectible with the gears of the vehicle transmission and is utilized for driving the pump 18 of the mechanism for forcing a flow of fluid into the hoisting mechanism 17 to thereby effect the raising of the dump body 14. The pump 18 may be of any suitable form arranged to effect the actuation of the hoisting mechanism 17 so as to raise and lower the dump body 14, and preferably embodies valve mechanism (not shown) disposed for control by a control lever 18a, which, through a push rod 18b, is connected to a hand lever 18c positioned within the vehicle cab. It will be understood, accordingly, that the hand lever 18c may be suitably manipulated so as to effect the desired dump body movements. As illustrated also, an additional hand lever 19a is positioned within the vehicle cab and is connected through a push rod 19b to the power takeoff 19, so as to permit a selective control of the driving connection for the pump 18.

The simplified sill frame construction is unique in that only three metal stampings are utilized; two side sills and a cross brace, which when assembled, support the dump body as well as its actuating mechanism. The side sills 21 of the sill frame 15 are of downwardly presenting channel section, having a vertically disposed flange 22, an inwardly disposed triangular web 23, and a downwardly disposed flange 24. The lower edge of the vertical flange 22 is flanged outwardly at 25 to form a support for the sill frame 15 on the chassis frame 16 of the vehicle. The chassis frame is also illustrated at 26 to disclose the fact that the sills may vary in vertical dimensions as well as in spacing and still be capable of receiving and supporting the sill frame 15 of the dump body.

For bracing the flange 25 relative to the web 22, pressed-out triangular portions 27 are provided throughout the length of the rail 21, as illustrated more clearly in Fig. 2. It will be noted also in Fig. 2 that the triangular top web 23 increases in width from the rear toward the front end of the frame. This reduces the spacing of the flanges 24 which take the thrust of the cylinder 28 of the hoisting mechanism 17.

The web 23 of the sill has a central portion removed to form an opening 29, the side edges about the opening being flanged downwardly at 31, as illustrated in Fig. 4. This provides additional strength and reduces the weight of the sill construction. The rear end of the sill frame 15 is sloped at 32 to permit the tilting of the dump body thereon, while permitting the body when lowered to rest directly upon the sill.

The cross-brace 34 comprises a stamping of downwardly presented channel section having extending flanges which engage the flange 22 and the web 23, of the sills 21, and is riveted, bolted, welded or otherwise secured thereto in rigid relation. The cross brace 34 is of arcuate shape to provide clearance for the cylinder 28, as illustrated in Fig. 4.

The floor of the dump body 14 rests upon a plurality of cross channel elements 35 which are supported on upwardly presented channel shaped rails 36, the web 37 of which rests upon the web 23 of the sills 21, as illustrated in Fig. 4. The rear ends of the rails 36 are provided with brackets 38, removably secured thereto. The brackets are provided with a hub 39 which extends over a shaft 41 which is rigidly secured to the flanges 22 of the sill frame 15, preferably by welding, to form a cross brace for the sills 21, as well as pivots upon which the dump body 14 may be tilted.

Angle shaped brackets 42 are bolted to the inner flanges 24 of the sills 21 and to the forward flange of the cross brace 34, as illustrated in Figs. 2, 4 and 5. The brackets 42 are provided with hubs 43 in which the trunnions 44 on the head of the cylinder 28 are secured for pivotal movement so as to support the cylinder for swinging movements relative to the chassis during the raising and lowering oprations. This construction materially reduces the strains on the side flanges 22 since the brackets 42 are supported by the flanges 24 directly adjacent to the head or wall of the cylinder 28. The bending moment on the trunnions, cross brace and sills, is practically eliminated since the stresses are applied longitudinally of the flanges 24. The greatest strain occurs when the body is loaded and initially moved from carrying position. At this time, the greatest angle occurs between the piston rod and a line between the shaft 41 and the point of connection between the piston rod and the dump body. These maximum strains are set up longitudinally of the flanges 24 and the strains on the flanges 22 set up by a bending moment by constructions employed heretofore, are entirely eliminated.

Referring more particularly to Figs. 1, 2 and 3, the hoisting mechanism 17 comprises a cylinder 28 having a packing head 45 at one end through which a reciprocable piston rod 46 extends. The other end of the cylinder is provided with a head 47 having the trunnions 44 disposed thereon. While I have illustrated and described the cylinder as having the trunnions disposed on the head 47, it is to be understood that the trunnions may be disposed elsewhere as on a band secured to the body of the cylinder.

A bracket 48 is provided on the bottom of the dump body to which the end 49 of the piston rod 46 is pivotally connected by a pin 51. A spring 52 is disposed about the piston rod, within the cylinder, for cushioning the outward movement of the piston rod and for aiding in returning the piston and rod toward the head 47. It will be understood that a suitable piston (not shown) is slidably received in the cylinder 28 and is secured to the piston rod 46. The head 47 also serves to support the previously described pump and valve control mechanism 18.

My construction is exceedingly unique when providing a dump body and supporting sills which may be attached to various types of chassis frames. The sills are so constructed as to eliminate a transverse bending moment when supporting the hoisting mechanism on trunnions so as to provide a longitudinal thrust on the inner sill flanges. My construction permits a sill undercarriage, a dump body along with the actuating elements therefor, to be constructed as a standard unit and furnished to the trade for application to a number of different automotive vehicles having different characteristics and chassis dimensions. This is believed to be a material advancement in the art.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A dump body and supporting structure attachable to a chassis frame including, in combination, a sill frame for supporting said body which includes longitudinally extending downwardly presented tapered channel elements, the outer sides of which are flanged outwardly at the bottom for engagement with longitudinal members of the chassis frame.

2. A dump body and supporting structure attachable to a chassis frame including, in combination, a sill frame for supporting said body which includes longitudinally extending downwardly presented tapered channel elements, the outer sides of which are flanged outwardly at the bottom for engagement with longitudinal members of the chassis frame, and a brace interconnecting said elements at the wide portion of said tapered elements.

3. A dump body and supporting structure attachable to a chassis frame including, in combination, a sill frame for supporting said body which includes downwardly presented tapered channel elements, the outer sides of which are parallel to the chassis frame, the inner sides of which converge toward the front of the sill frame, a cross brace interconnecting the elements near the front of the frame, brackets supported on the inner sides of said elements and the cross brace, and a body lifting mechanism supported by said brackets.

4. A dump body and supporting structure attachable to a chassis frame including, in combination, a sill frame for supporting said body which includes downwardly presented tapered channel elements, the outer sides of which are parallel to the chassis frame, the inner sides of which converge toward the front of the sill frame, a cross brace interconnecting the elements near the front of the frame, brackets supported on the inner sides of said element and the cross brace, a body lifting mechanism supported by said brackets, and a shaft interconnecting the rear end of said elements and forming pivots upon which the dump body is tiltable.

5. A dump body and supporting structure attachable to a chassis frame including, in combination, a sill frame including downwardly presented tapered channel elements, the inner sides of which converge toward the front of the frame, brackets supported on said inner sides near the front end thereof, and a body raising mechanism tiltably supported by said brackets.

6. A dump body supporting and actuating mechanism mountable on a chassis frame including, in combination, sill elements for supporting the body on the chassis frame, a cross brace intersecting said elements near the front end thereof, a shaft welded to the elements at the rear end and forming pivots and the sole rear cross brace therefor, brackets on the body engaging the shaft for supporting the body for tilting movement, and a hoisting mechanism supported for pivotal movement on the cross brace and inner sides of the elements and attached to the body for effecting the raising and lowering thereof.

7. A dump body supporting structure attachable to the longitudinally extending members of a chassis, including a pair of longitudinally extending downwardly presenting channel-shaped elements, the laterally outer leg of each whereof is provided with an outwardly extending flange, said flanges being positioned to bear upon said chassis members respectively and constituting the sole supporting connection between said elements and said chassis, and means connecting said elements together.

8. A dump body supporting structure attachable to the longitudinally extending members of a chassis, including a pair of longitudinally extending downwardly presenting channel-shaped elements, the laterally outer leg of each whereof is provided with an outwardly extending flange, said flanges being positioned to bear upon said chassis members respectively and constituting the sole supporting connection between said elements and said chassis, and means connecting said elements together, the webs of said elements being wider at one end than at the other, and a dump body hoist mechanism carried by said elements adjacent said one end.

9. A dump body supporting and actuating mechanism mountable on a chassis frame including in combination, longitudinally extending laterally spaced frame elements, a cross brace interconnecting said elements near one end thereof, means adjacent the other end of the frame elements for supporting the dump body for tilting movement, a hoisting mechanism attached to the body for effecting the raising and lowering thereof, and means forming a first direct connection between the hoisting mechanism and the cross brace and an additional direct connection between the hoisting mechanism and the frame elements respectively.

10. A dump body supporting and actuating mechanism mountable on a vehicle chassis frame, including in combination, a rear cross member, a front cross brace, supporting means connected at the front end to said front cross brace and connected at the rear end to said rear cross brace, means connected to said mechanism adjacent the rear end thereof for forming a pivotal bearing support for the dump body, and hoisting means connected to said dump body and to said front cross brace adjacent the longitudinal center line of the mechanism, said supporting means having parts extending forwardly from the rear cross brace in forwardly converging relation and being connected to the front cross brace immediately adjacent the point of connection between the front cross brace and the hoisting mechanism.

11. A dump body supporting and actuating mechanism mountable on a vehicle chassis frame, including in combination, a rear cross brace member, a front cross brace member, a pair of side frame members connected at the front ends thereof to said front cross brace member and connected at the rear end thereof to said rear cross brace member, means connected to said mechanism adjacent the rear end thereof for forming a pivotal bearing support for the dump body, and hoisting means connected to said dump body and to said front cross brace adjacent the longitudinal center line of the mechanism, said side frame members having parts extending forwardly from the rear cross brace member in forwardly converging relation and being connected to the front cross brace member immediately adjacent the point of connection between the front cross brace member and the hoisting mechanism.

EDWARD R. BARRETT.